US011100724B2

United States Patent
Brimhall et al.

(10) Patent No.: US 11,100,724 B2
(45) Date of Patent: Aug. 24, 2021

(54) SYSTEMS AND METHODS FOR GENERATING AND INTELLIGENTLY DISTRIBUTING FORMS OF VIRTUAL REALITY CONTENT

(71) Applicant: SEEK XR, INC., Lehi, UT (US)

(72) Inventors: Thane Brimhall, Saratoga Springs, UT (US); Thomas Griffiths, American Fork, UT (US); Trey Nelson, Provo, UT (US); Christopher Tart, Taylorsville, UT (US)

(73) Assignee: SEEK XR, INC., Lehi, UT (US)

( * ) Notice: Subject to any disclaimer, the term of this patent is extended or adjusted under 35 U.S.C. 154(b) by 0 days.

(21) Appl. No.: 17/037,357

(22) Filed: Sep. 29, 2020

(65) Prior Publication Data

US 2021/0012579 A1 Jan. 14, 2021

Related U.S. Application Data

(63) Continuation of application No. 16/880,893, filed on May 21, 2020, now Pat. No. 10,839,615, which is a continuation of application No. 16/666,944, filed on Oct. 29, 2019, now Pat. No. 10,665,037.

(60) Provisional application No. 62/772,619, filed on Nov. 28, 2018.

(51) Int. Cl.
*G06T 19/20* (2011.01)
*G06T 19/00* (2011.01)

(52) U.S. Cl.
CPC ............ *G06T 19/20* (2013.01); *G06T 19/006* (2013.01); *G06T 2215/16* (2013.01)

(58) Field of Classification Search
None
See application file for complete search history.

(56) References Cited

U.S. PATENT DOCUMENTS

| 6,208,347 B1 | 3/2001 | Migdal et al. |
| 7,266,616 B1 | 9/2007 | Munshi et al. |
| 7,742,061 B2 | 6/2010 | Chen |
| 10,600,249 B2 | 3/2020 | Daniels et al. |

(Continued)

OTHER PUBLICATIONS

"Cloud-Based Dynamic Streaming and Loading of 3D Scene", by Budianto Tandianus, Hock Soon Seah, Tuan Dat Vu, and Anh Tú Phan, 2018 International Conference on Cyberworlds, pp. 409-414, 2018. (Year: 2018).*

(Continued)

*Primary Examiner* — James A Thompson
(74) *Attorney, Agent, or Firm* — Workman Nydegger

(57) ABSTRACT

A method of providing virtual reality (VR) content can include the acts of, at a server: obtaining a 3D image file, creating a plurality of VR models or scene files from the 3D image for each VR rendering platform included in a list of VR rendering platforms, storing each VR model or scene file within a data store, receiving a request for an VR model or scene file as a result of a universal link being selected at an end user device, wherein the universal link points to an endpoint at the server that comprises logic to determine which of the plurality of stored VR models or scene files to provide to an entity accessing the universal link, determining an VR rendering platform associated with the end user device, and determining a particular VR model or scene file matching the VR rendering platform.

20 Claims, 5 Drawing Sheets

(56) References Cited

U.S. PATENT DOCUMENTS

| | | | |
|---|---|---|---|
| 10,630,797 B2 | 4/2020 | Goel et al. | |
| 10,665,037 B1 | 5/2020 | Brimhall et al. | |
| 2010/0033484 A1 | 2/2010 | Kim et al. | |
| 2013/0249948 A1* | 9/2013 | Reitan | G06T 19/006 345/633 |
| 2016/0027216 A1* | 1/2016 | da Veiga | G06F 3/0484 345/419 |
| 2017/0287214 A1* | 10/2017 | Anderson | G06T 19/006 |
| 2018/0130259 A1* | 5/2018 | Leefsma | G06Q 10/101 |
| 2018/0143756 A1 | 5/2018 | Mildrew et al. | |
| 2018/0261037 A1 | 9/2018 | Hudson | |
| 2018/0308287 A1 | 10/2018 | Daniels et al. | |
| 2019/0108672 A1* | 4/2019 | Ghelberg | G06T 17/20 |
| 2019/0114061 A1 | 4/2019 | Daniels et al. | |
| 2019/0147626 A1 | 5/2019 | Gebbie et al. | |
| 2019/0238648 A1 | 8/2019 | Goel et al. | |
| 2019/0340834 A1 | 11/2019 | Martinez Molina et al. | |
| 2019/0347866 A1 | 11/2019 | Gonzalez Aguirre et al. | |
| 2019/0371073 A1 | 12/2019 | Harviainen | |
| 2020/0007556 A1 | 1/2020 | Brebner | |
| 2020/0007615 A1 | 1/2020 | Brebner | |
| 2020/0218519 A1 | 7/2020 | Brebner | |
| 2020/0226839 A1 | 7/2020 | Daniels et al. | |
| 2020/0286303 A1 | 9/2020 | Brimhall et al. | |
| 2020/0292013 A1* | 9/2020 | Goel | F16H 57/043 |
| 2021/0012578 A1 | 1/2021 | Brimhall et al. | |
| 2021/0056762 A1* | 2/2021 | Robbe | G06F 16/29 |

OTHER PUBLICATIONS

"Scene Integration for Virtual Worlds", by Michael Kalochristianakis, Markos Zampoglou, Kostas Kontakis, Kostas Kapetanakis, and Athanasios Malamos, 2014 International Conference on Telecommunications and Multimedia (TEMU), pp. 243-247, 2014. (Year: 2014).*

* cited by examiner

SYSTEMS AND METHODS FOR GENERATING AND INTELLIGENTLY DISTRIBUTING FORMS OF VIRTUAL REALITY CONTENT

CROSS-REFERENCE TO RELATED APPLICATIONS

This application is a Continuation of, and claims priority to, U.S. patent application Ser. No. 16/880,893, filed May 21, 2020, which is a Continuation of U.S. patent application Ser. No. 16/666,944, filed Oct. 29, 2019 and issued as U.S. Pat. No. 10,665,037 on May 26, 2020, which claims the benefit of U.S. Provisional Patent Application Ser. No. 62/772,619, filed Nov. 28, 2018 and titled "SYSTEMS AND METHODS FOR GENERATING AND INTELLIGENTLY DISTRIBUTING FORMS OF EXTENDED REALITY CONTENT," which applications are incorporated herein by this reference in their entirety.

BACKGROUND

Technical Field

This disclosure generally relates to extended reality (XR) technologies. More specifically, the present disclosure relates to the acquisition, generation, and intelligent distribution of XR content.

Related Technology

In recent times, advances in computing power have enabled computing systems to provide new and varied experiences to users. One such category of new and varied user experiences relates to the areas of computer-implemented realities. For example, augmented reality (AR) is a live, direct or indirect view of a physical, real-world environment whose elements are augmented (or supplemented) by computer-generated sensory input such as sound, video, graphics, or GPS data. Augmented reality utilizes a user's existing reality and adds to it via a computing device, display, or projector of some sort. For example, many mobile electronic devices, such as smartphones and tablets, can overlay digital content into the user's immediate environment through use of the device's camera feed and associated viewer. Thus, for example, a user could view the user's real-world environment through the display of a mobile electronic device while virtual objects are also being displayed on the display, thereby giving the user the sensation of having virtual objects together with the user in a real-world environment. Custom AR-enabled headsets can also be used.

Virtual reality (VR) is another example of a computer-implemented reality. In general, VR refers to computer technologies that use reality headsets and/or other peripheral devices to generate sounds, images, and other sensations that replicate a real environment or that form an imaginary world. Virtual reality immerses a user in an entirely virtual experience and allows the user to interact with the virtual environment. A true VR environment engages all five senses (taste, sight, smell, touch, sound), but as used herein, the term "virtual reality" or "VR" is intended to include those computer-implemented realities that engage at least the user's sense of sight and that do not display the user's immediate visual environment.

Another example of a computer-implemented reality is a hybrid reality called mixed reality (MR). Mixed reality represents the merging of real and virtual worlds to produce new environments and visualizations where physical and digital objects co-exist and interact in real time. Many MR implementations place new imagery within a real space and often do so in such a way that the new imagery can interact—to an extent—with what is real in the physical world. For example, in the context of MR, a user may view a white board through an MR-enabled headset and use a digitally-produced pen (or even a capped physical pen) to write on the white board. In the physical world, no writing appears on the white board, but within the MR environment, the user's interaction with a real-world object caused a digital representation of the writing to appear on the white board. In MR systems, some synthetic content can react and/or interact with the real-world content in real time.

An umbrella term, namely extended reality (XR), incorporates each of the forms of computer-generated reality content—AR, VR, and MR. As used herein, the term "extended reality" or "XR" refers generally to all real and virtual combined environments and human-machine interactions generated by computer technology and wearables. Extended reality includes all its descriptive forms, such as digital representations made or displayed within AR, VR, or MR.

Extended reality experiences are a fairly recent development, and as a result, many different entities are each developing their own XR rendering platforms and corresponding model or scene files to be used on those platforms. For example, Apple Corporation has a rendering platform known as ARKit, which uses AR object files in the .usdz format to provide AR experiences to a user. Android Corporation provides the ARCore platform and uses .sfb files to provide AR user experiences to a user. Other platforms use the .gltf AR object file format to provide AR user experiences to a user.

However, even though a group of platforms may use a single object file format (e.g., .gltf, .sbf, or .usdz), there is a lack of file format standardization that leads to incompatibility between platforms and even within different versions or operating parameters of the same platform. For example, a .gltf AR object file format may render the desired AR content when provided to a given platform's AR viewer, but on a different platform's AR viewer, or even within different versions of the AR viewer, the AR content may be rendered improperly. That is, a .gltf file created for one platform is often not suitable for a different platform that uses the same file type.

Thus, if an entity wishes to provide a uniform XR experience across a number of different platforms, such an endeavor can be particularly difficult. In particular, the entity may need to develop a number of different XR object files in varying formats to be able to meet the needs of the various XR platforms. Further, as each platform or operating environment is updated, the associated object files may similarly require an update to function properly. This places a burden on providers of XR content and can complicate the generation, storage, and recovery of the correct object file at each implementation. This may be particularly difficult for novice users who have little technical knowledge on how to create and/or modify AR files.

Accordingly, there are a number of disadvantages with the acquisition, generation, and intelligent distribution of XR content that can be addressed.

BRIEF SUMMARY

Implementations of the present disclosure solve one or more of the foregoing or other problems in the art with the acquisition, generation, and intelligent distribution of XR content. In particular, one or more implementations can include a method for providing XR content. In some embodiments, the XR content is VR content.

For example, a method for providing VR content can include a number of acts performed at a server, including (i) receiving a 3D image file at a server, (ii) rendering a 3D image from the 3D image file, (iii) receiving user input modifying the 3D image, (iv) creating a plurality of VR models or scene files from the 3D image such that each of the VR models or scene files is formatted for a different, particular VR rendering platform, (v) creating a universal link pointing to an endpoint at the server, the endpoint including logic to determine which of the plurality of VR models or scene files to provide to an entity accessing the universal link, (vi) providing the universal link to the user interface where the universal link is operable at an end user device to enable an end user of the end user device to navigate to the endpoint at the server by accessing the universal link, (vii) receiving a request for an VR model or scene file as a result of the universal link being selected at the end user device, (viii) determining an VR rendering platform associated with the end user device, and (ix) determining, by the logic and based on the VR rendering platform, one of the VR models or scene files of the plurality of VR models or scene files matching the VR rendering platform.

In some embodiments, the method can include sending a determined VR model or scene file to the end user device that is operable to render an VR experience at the end user device, which in some embodiments includes the determined VR model or scene file being compatible with one or more of the VR viewer, a version of the VR viewer, a browser type, a version of the browser type, an operating system, or a version of the operating system on the end user device.

In some embodiments, creating the plurality of VR models or scene files is performed by creating a derivative VR model or scene file for each VR rendering platform included in a predetermined list of VR rendering platforms. The method can additionally include determining the presence of additional virtual reality rendering platforms within the predetermined list and as a result, creating additional corresponding derivative VR models or scene files.

Embodiments of the present disclosure also include a system for providing virtual reality (VR) content. The system can include (i) a user interface, (ii) a generator for creating a plurality of VR models or scene files from a 3D image file that are each formatted for a different, particular VR rendering platform, and (iii) a computer system operably connected to the user interface and to the generator. The computer can include one or more processors and one or more hardware storage devices having stored thereon computer-executable instructions that, when executed by the one or more processors, cause the computer system to perform at least the following: (i) receive an image file, (ii) render a 3D image from the image file, (iii) create, using the generator, a plurality of VR models or scene files from the 3D image, (iv) provide, at the user interface, a universal link associated with the plurality of VR models or scene files, (v) receive a request for an VR model or scene file, as a result of the universal link being selected, the request associated with an VR rendering platform, and (vi) identify a particular VR model or scene file based on the VR rendering platform associated with the request.

In some embodiments, the computer-executable instructions can further cause the computer system to compress the 3D image file, and in some embodiments, the plurality of VR models or scene files are created based on the compressed 3D image file. Compressing the 3D image file can include splitting the 3D image into a plurality of distinct vertex groups, removing or replacing invisible or less visible vertices, and recombining the vertex groups into a vertex reduced 3D image. Compressing the 3D image may include providing 2D texture data associated with the 3D image file to a downscaler to create a consistent physical size when viewed in a real-world scale in an XR environment. Compressing the 3D image can additionally, or alternatively, include providing the 3D image (or vertex reduced 3D image) to a downscaler to reduce the physical size of textures associated with the 3D image and rebaking textures associated with the 3D image to create a pixel-reduced 3D image.

Accordingly, systems and methods for providing XR content broadly, and VR content more specifically, are disclosed.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope.

The disclosure will be described and explained with additional specificity and detail through the use of the accompanying drawings in which.

DETAILED DESCRIPTION

Figure 1:
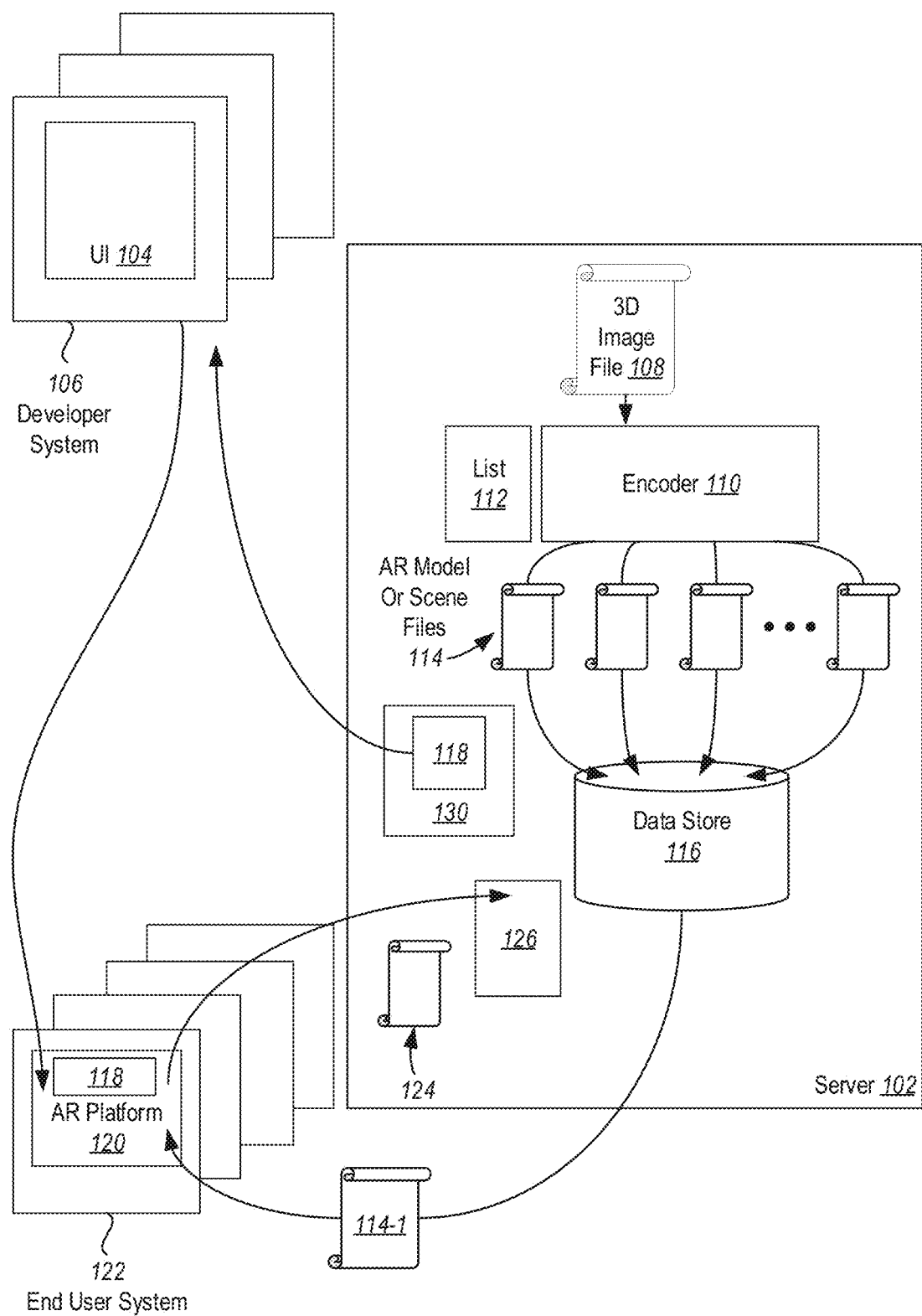
FIG. 1 illustrates a system for generating and intelligently distributing forms of XR content, particularly AR content, according to one or more embodiments of the present disclosure.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, any headings used herein are for organizational purposes only, and the terminology used herein is for the purpose of describing the embodiments. Neither are not meant to be used to limit the scope of the description or the claims.

Overview

As provided above, XR experiences are a fairly recent development, and as a result, many different entities are each developing their own XR rendering platforms and corresponding model or scene files to be used on those platforms. For example, Apple Corporation has a rendering platform known as ARKit, which uses AR object files in the .usdz format to provide AR experiences to a user. Android Corporation provides the ARCore platform and uses .sfb files to provide AR user experiences to a user. Other platforms use the .gltf AR object file format to provide AR user experiences to a user.

However, even though a group of platforms may use a single object file format (e.g., .gltf, .sfb, or .usdz), there is a lack of file format standardization that leads to incompatibility between platforms and even within different versions or operating parameters of the same platform. For example, a .gltf AR object file format may render the desired AR content when provided to a given platform's AR viewer, but on a different platform's AR viewer, or even within different versions of the AR viewer, the AR content may be rendered improperly. That is, a .gltf file created for one platform is often not suitable for a different platform that uses the same file type.

Additionally, input source files from which an AR object file could be generated, such as 3DS, A3D, COB, SCN, C4D, DAE, DXF, IGES, IV, FBX, KMZ, LW, LWB, LWM, LWO, LWS, LXO, MA, MB, MAX, OBJ, PLY, SKP, STEP, STL, WRL, WRL97, VRML, X, X3D, or XSI files, can vary widely and are not necessarily cross-compatible with all systems. For example, an FBX input source file may not be suitable on different platforms that both use the FBX file format.

Thus, if an entity wishes to provide a uniform XR experience across a number of different platforms, such an endeavor can be particularly difficult. In particular, the entity may need to develop a number of different XR object files in varying formats to be able to meet the needs of the various XR platforms. Further, as each platform or operating environment is updated, the associated object files may similarly require an update to function properly. This places a burden on providers of XR content and can complicate the generation, storage, and recovery of the correct object file at each implementation. This may be particularly difficult for novice users who have little technical knowledge on how to create and/or modify AR files.

Systems and methods are needed for generating and intelligently distributing forms of XR content. In particular, systems and methods are needed that can continually and dynamically adapt to each of the many and varied AR platforms that exist and that continue to be produced.

Embodiments illustrated herein implement a system that allows a developer to provide a model, such as one or more 2D image files or a 3D model, to the system through a unique and novel user interface, and where the system is able to create multiple different AR models or scene files that can be used with multiple different platforms. The system is also able to create a universal link pointing to an endpoint at the system. The endpoint includes logic that allows the system to identify an appropriate AR model or scene file for an entity following the link.

In this way, a simplified user interface can be implemented which allows even novice developers to quickly and easily create and share AR experiences. Whereas previously, the developer would have needed advanced skills in AR model and scene creation, as well as advanced skills in user interface programming, a developer can now perform an abbreviated simplified upload process on a 3D model, where the developer receives in exchange a link that the developer can simply cut and paste into appropriate interface code for an AR experience on a particular AR platform. An AR experience includes, for instance, AR models and, optionally, associated sounds/sound support files to complement the AR experience. Furthermore, an AR experience may include a rendering of one or more AR models anchored to a static object within a user's real-world environment (e.g., a wall, floor, and/or ceiling) and/or anchored to a moving/movable object within the user's real-world environment (e.g., a user's hand or other body part, another person, etc.). An end-user at the AR platform will then be provided with the appropriate link in the appropriate format allowing the end-user at the AR platform to experience the AR experience as designed by the developer.

For example, a novice developer may develop an AR experience including an AR object (e.g., an article of clothing) anchored to a movable real-world object (e.g., a part of a viewer's body) on a first AR platform with hardware constraints/capabilities that are different from those of an AR platform of a viewer. The AR experience may even comprise a filetype that is not recognized by the platform of the viewer. The developer may then upload the AR experience (e.g., including any associated sounds) to a server that creates a number of different AR files based on the uploaded AR experience that are operable on different AR platforms (e.g., lower-end AR platforms). In response to a request, the server may then identify and provide an appropriate AR file or files for the requesting system based, for example, on an operating system or version, user agent string, and/or hardware capabilities associated with the requesting system. In this regard, disclosed embodiments allow for the sharing of AR experiences in a manner that is not tied to a particular AR file type or AR app or platform.

In some implementations, the server determines that the requesting system lacks the capability to render/display a full AR experience as intended by the developer. In response, the server may identify and/or provide 3D models, 2D images, and/or other files for displaying at least some of the content of the AR experience on the requesting system. Thus, disclosed embodiments may provide the best possible user experience for viewing/experiencing particular content, even where the requesting system is incapable of rendering a full AR experience intended by the developer.

Systems and Methods for Receiving and Intelligently Distributing Forms of XR Content Referring now to FIG. 1, an example is illustrated. FIG. 1 illustrates a server 102. The server 102 is able to display a user interface 104 in a developer system 106. At the developer system 106, a developer can use the user interface 104 to select and upload a 3D model to the server 102, such as in the present example a 3D image file 108. The 3D image file can correspond to any 3D image/model file format, such as 3DS, A3D, COB, SCN, C4D, DAE, DXF, IGES, IV, FBX, KMZ, LW, LWB, LWM, LWO, LWS, LXO, MA, MB, MAX, OBJ, PLY, SKP, STEP, STL, WRL, WRL97, VRML, X, X3D, or XSI.

At the server 102, the image file 108 is processed by an encoder 110. The encoder 110 is configured to create a number of different augmented reality model or scene files. In particular, the encoder 110 processes the 3D image file 108 to identify various surfaces, textures, shading, geometry, or other characteristics of an object represented by the 3D image file 108.

Alternatively or additionally, a user may provide various textures, shading, transparencies, and/or other inputs to modify the object represented by the 3D image file 108.

The encoder 110 is then configured to use this identified information to create one or more augmented reality model or scene files. Typically, the encoder 110 is configured to create augmented reality model or scene files for any augmented reality platforms about which the server 102 is aware. For example, the server 102 may include an augmented reality platform list 112. The list 112 may include a listing of various augmented reality platforms (various versions of devices, web browsers/services, social media platforms, AR viewer/applications, and/or operating systems) and/or AR file formats associated with each. Alternatively, or additionally, the list 112 may include parameters, requirements, or other information about the augmented reality platforms enumerated in the list 112. This information can be used by the encoder 110 to determine how to transport the 3D image file 108 to create the augmented reality model or scene files 114 for each known AR platform.

It should also be noted that the list 112 is, in some implementations, updatable. For example, when a new AR rendering platform becomes available, platform information for rendering AR content on the new AR rendering platform are entered/updated into list 112. Consequently, an additional AR model or scene file 114 is created which corresponds to the new AR rendering platform.

The augmented reality model or scene files 114 are then stored in a data store 116 for later use by end-user systems implementing AR platforms.

A link 118 is also created at the server 102. This link is associated with all of the augmented reality model or scene files 114 that were created for the 3D image file 108. Thus, an AR platform using the link 118 will receive back the specific augmented reality model or scene file from the augmented reality model or scene files 114 appropriate for the specific augmented reality platform. For example, the server 102 provides the link 118 in the user interface 104 of the developer system 106. The developer at the developer system 106 and then obtain the link 118 from the user interface 104 developer system and provide the link as appropriate to an AR platform 120 and an end-user system 122.

For example, the developer at the developer system 106 may create a webpage, social media post, app, or other user interface element for allowing a user to access an augmented reality model or scene file or an augmented reality experience desired by the developer at the developer system 106. The developer can provide the link 118 in the user interface which is then provided to the AR platform 120 on the end-user system 122.

A user using the AR platform 120 can select the link 118 which sends a request to the server 102. In particular, the link 118 is to an endpoint 126 at the server 102. The endpoint 126 may be a service, such as a web service or other service, which identifies certain characteristics about the platform 120 to identify an appropriate augmented reality model or scene file to return to the AR platform 120.

The endpoint 126 can identify an appropriate augmented reality model or scene file in a number of different ways. For example, in some embodiments, the request 124 will include a user agent string identifying a user agent for the AR platform 120. The user agent is able to specifically identify the AR platform 120 which will identify capabilities of the AR platform 120 (e.g., based on the version of the AR platform). In some embodiments, the user agent string may identify the type of user system 122. The type of user system 122 may limit the types of AR platforms that can be implemented on the user system 122. In some embodiments, the AR platform 120 is implemented using an Internet browser. In some embodiments, the type of Internet browser may limit the types of AR platforms that may be used. The user agent string can identify the browser, and thus in some embodiments may be used to identify the AR platform 120, which can then be used by the endpoint 126 to identify the appropriate augmented reality model or scene file from the augmented reality model or scene files 114.

It will be appreciated that other factors for identifying an appropriate augmented reality model or scene file are within the scope of this disclosure. For example, an endpoint 126 may determine an appropriate augmented reality model or scene file based on hardware specifications associated with the AR platform 120 or a computing system associated therewith. For example, an appropriate augmented reality model or scene file may depend on the processing capabilities (e.g., based on the type of CPU and/or GPU of the system), available memory, or other hardware characteristics of the relevant system. In some instances, the endpoint 126 analyzes factors for identifying an appropriate AR model or scene file in a hierarchical manner. For example, the endpoint 126 may first identify the requesting operating system (OS) or version thereof. In some instances, the operating system/version is determinative of which AR model files are compatible with the requesting system, and the inquiry into the appropriate AR model or scene file may end. In other instances, the OS is not determinative, and the endpoint 126 analyzes one or more user agent strings, if present (e.g., with a web request), to identify an appropriate AR model or scene file. Where user agent strings are not present, the endpoint 126 may analyze the hardware specifications of the requesting system to determine an appropriate AR model or scene file.

In the example illustrated in FIG. 1, the augmented reality model or scene file 114-1 is returned to the AR platform 120 where it can be used to render an augmented reality experience to a user at the end-user system 122. In some embodiments, the model or scene file 114-1 which is selected to be returned to the AR platform 120 is based on the identity of the AR platform 120 making the request 124 (e.g., as identified by the user agent string, mentioned above). The server 102 can select the appropriate AR model or scene file 114-1 from the plurality of AR model or scene files 114 which was generated by the encoder 110 and stored on data store 116 based on the 3D image file 108.

The end user system 122 may utilize the received augmented reality model or scene file 114-1 to render an augmented reality object within the rendering of a real-world environment.

In some instances, the endpoint 126 determines that the AR platform 120 is incapable of rendering the particular AR model or scene file requested in a desirable, seamless manner (or is incapable of rendering AR scenes generally) based on the OS/version of the requesting platform, a user agent string, or some other aspect of the requesting platform such as hardware characteristics. In response to determining that the requesting AR platform 120 will not provide an optimal AR experience, the server 102 may, instead of providing an AR model or scene file 114-1, provide a 3D model associated with the content that would have been part of the desired AR model or scene file 114-1. If the endpoint 126 determines that the AR platform would similarly be incapable of rendering the 3D model in a satisfactory manner, the server provides, in some instances, a 2D image associated with the content that would have been part of the desired AR model or scene file 114-1. In this way, the server may provide an AR model or scene file 114-1, a 3D model, or a 2D image in accordance with the best way for a user to experience the desired content on the requesting AR platform 120.

Figure 2:
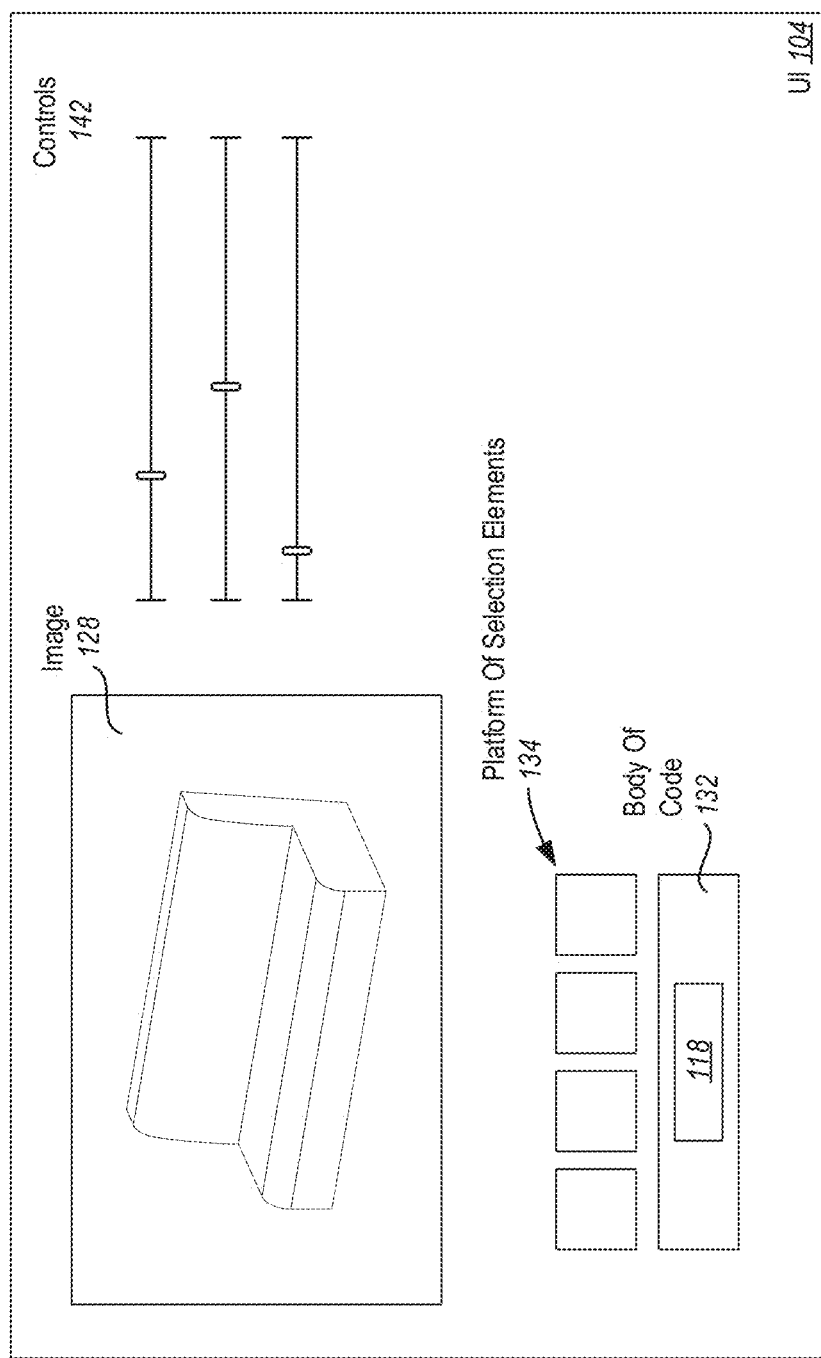
FIG. 2 illustrates an exemplary user interface for receiving and/or adjusting aspects of a digital model prior to generating forms of XR content, and particularly AR content, therefrom in accordance with one or more embodiments of the present disclosure.

Referring now to FIG. 2, one screen of the user interface 104 displayed to a user is illustrated. In the example illustrated in FIG. 2, the user can modify various characteristics of a 3D image file rendered in the user interface 104. FIG. 2 illustrates an image 128, which in this example is a rendering of a 3D image file. The user interface includes various controls 142 that allows a user to make various changes to the image 128. For example, the user can modify coloring and/or shading of various portions of the image 128, transparency of various portions of the image 128, scale (including potentially proportions) of various portions of the image 128, positioning, rotation, texture, optical properties, brightness, contrast, shadows/shadowing effects etc. The user interface may also include controls for enabling/modifying any sounds associated with the AR experience. Once a user has finished performing manually guided modifications to the image 128 (which can include selectable preset modifications), the user can indicate that user guided modifications are complete by selecting an appropriate user interface element which indicates to the server 102 that the modifications are complete.

Alternatively, or additionally, embodiments may include interface elements in the user interface 104 which allow the user to cause automated modifications to the image 128 to be performed. For example, embodiments may include a processing pipeline which includes processing elements configured to modify the image 128 according to predetermined logical processing based on known attributes of an AR platform. For example, some AR platforms are implemented on tinted display devices. The existence of a tint could be determined from the identity of the AR platform (e.g., as listed on list 112 of FIG. 1), and automated modifications could be made to the image 128 to compensate for an existing tint on an end user device. In other instances, some AR platforms are incapable of rendering certain graphical or other attributes that may be present in or with an image 128 (e.g., sound). For example, some AR platforms are incapable of rendering shadows, and upon determining the limits/constraints of the AR platform (e.g., determining from list 112 or another database that the intended AR platform cannot render shadows), an automatic modification is made to the image 128 to compensate for the limits/constraints of the AR platform. Such automatic modifications could be initiated by the user, or implemented automatically, regardless of the presence of an explicit user command. In the example concerning shadows, an automated modification could include replacing the shadows with a baked texture version added to the mesh, or, because some AR platforms explicitly disallow baked shadows, omitting shadowing features/effects altogether.

Once manually guided and/or automatic processing of the image 128 are completed, the user can select the appropriate user interface element to indicate to the serve that the modifications are complete. In response to this user input, the modified image 108 is provided to the encoder 110 illustrated in FIG. 1 to create the augmented reality model or scene files 114 illustrated above.

Additionally, a link generator 130 (see FIG. 1) will generate the link 118 as described above. FIG. 2 illustrates that the link 118 may be displayed in a body of code 132. The body of code 132 is code that is appropriate for including the link 118 code for a certain AR platform. FIG. 2 illustrates a set of platform selection elements 134. A developer/user can select one of the platform selection elements 134 to select an appropriate augmented reality platform. The appropriate augmented reality platform can be a type of AR platform on which the developer/user intends to present AR content to clients/end users (e.g., a web service, device, operating system, browser, application, etc.). For example, the platform selection elements 134 include an element for standard HTML code. Alternatively or additionally, the platform selection elements 134 may include an element for HTML 5 code. Alternatively or additionally, platform selection elements 134 may include an element for certain social media platforms. Alternatively, or additionally, platform selection elements 134 may include an element for certain device platforms such as iOS or Android. Alternatively, or additionally, the platform selection elements 134 may include elements for types of browsers or other AR viewer/applications or operating systems. In some instances, this functionality can assist developers/users in embedding and/or providing access to the link 118 to clients/end users in various forms (whereby a client may send a request for an AR model or scene file 114-1 which is tailored to the client's AR platform).

When a user selects one of the platform selection elements 134, the appropriate body of code 132 including the link 118 may be displayed in the user interface 104. In some embodiments, this will allow the user to select body of code 132 including the link 118, copy the body of code, and to paste the body of code 132 into code being developed by a developer to create an XR experience.

Figure 3:
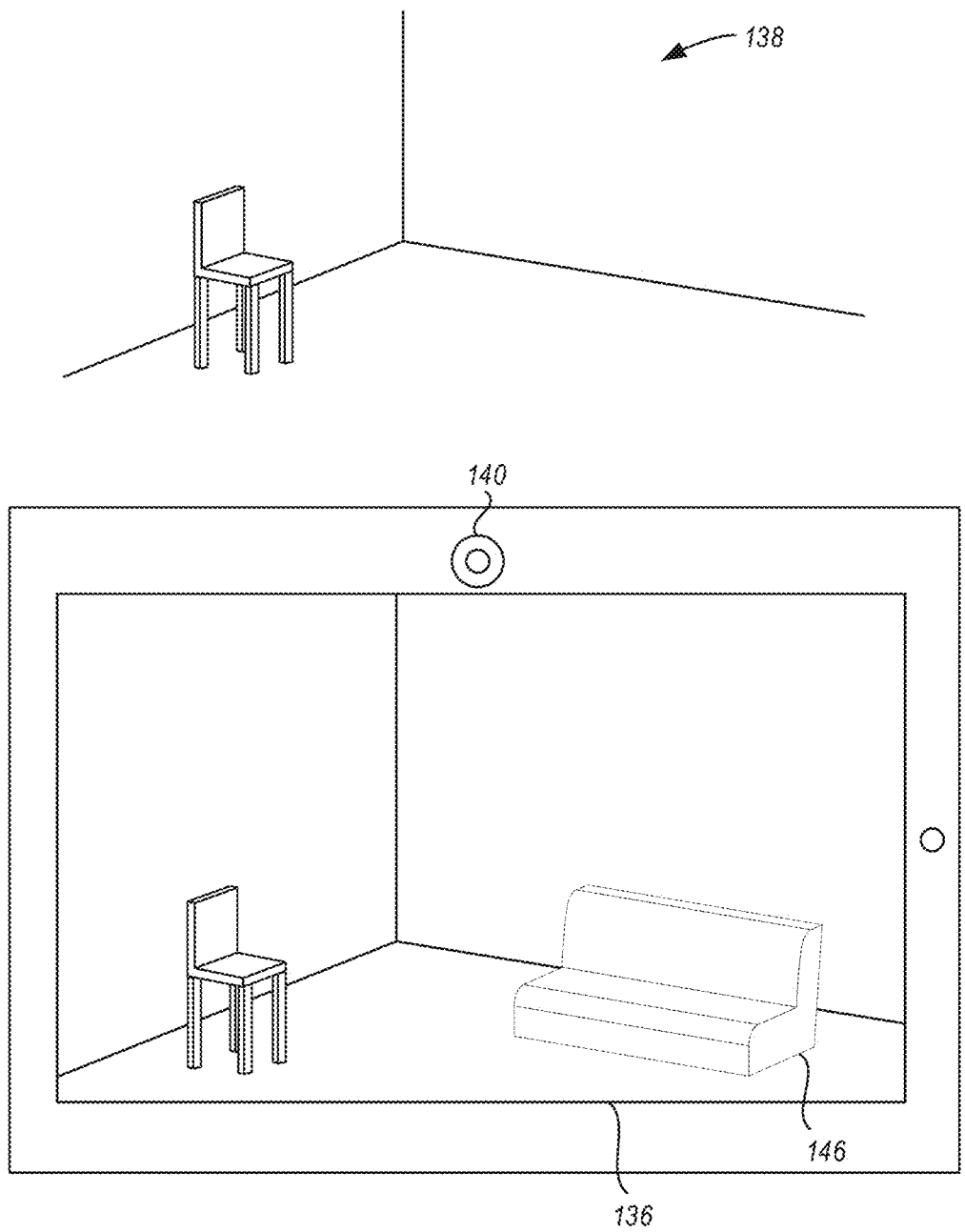
FIG. 3 illustrates an exemplary implementation of AR content being rendered in a physical environment according to one or more embodiments of the present disclosure.

Referring now to FIG. 3 a user experience is illustrated. FIG. 3 illustrates a user interface 136 displayed by the AR platform 120. FIG. 3 illustrates a real-world environment 138. Real-world environment 138 may be captured by a camera 140 or another sensor. A representation 144 of the real-world environment 138 can be displayed in the user interface 136 (however, in some instances, real-world environment 138 may be visible to a user through an optically transmissive SRG display, such that no camera is used to present the real-world environment 138 to the user). Additionally, the AR platform 120, as shown in FIG. 1 will access code produced by a developer, where the code includes the body of code 132, including the link 118. This will cause the AR platform 120 to follow the link 118 to the endpoint 126. The endpoint 126 will identify the appropriate AR model or scene file 114-1 from the data store 116 (e.g., based on the identity of the AR platform which selected/followed the link 118). In particular, AR model or scene file 114-1 is returned to the AR platform 120 in response to link 118 being accessed on AR platform 120. As illustrated in FIG. 3, this allows an AR object 146 to be displayed in the user interface 136 along with the representation 144 real-world environment 138.

In the embodiment shown in FIG. 3, the AR object 146 is anchored to one or more static real-world surfaces or objects (e.g., the floor and/or the wall). It will be appreciated that an AR object may be anchored to any real-world object, such as a movable real-world object that is tracked in the real-world environment by the camera 140. For instance, the camera 140 may apply depth tracking/estimation methods such as active stereo (for multiple cameras), or single-camera methods including, but not limited to, plenoptic camera, semantic segmentation and depth estimation, dense tracking and mapping, motion-based depth detection, dual pixel depth estimation, color shift model, left-right consistency, etc. The AR platform may then render the AR object (e.g., an AR article of clothing or jewelry) such that the AR object is anchored to one or more tracked portions of a moving/movable real-world object (e.g., fingers of an AR glove may be anchored to real-world fingers of a user).

Systems and Methods for Content Optimization and Storage

XR content files, including AR models and scenes can be very large and difficult or time consuming to transfer over a network. In particular, when AR models are implemented on mobile electronic devices, large files can be prohibitive. Accordingly, methods and systems for optimizing/decimating and storing XR content, in particular AR models, are needed.

Embodiments of the present disclosure enable optimization of XR content, particularly AR models, without a substantial loss in quality of the AR model when implemented on the mobile electronic device.

Figure 4:
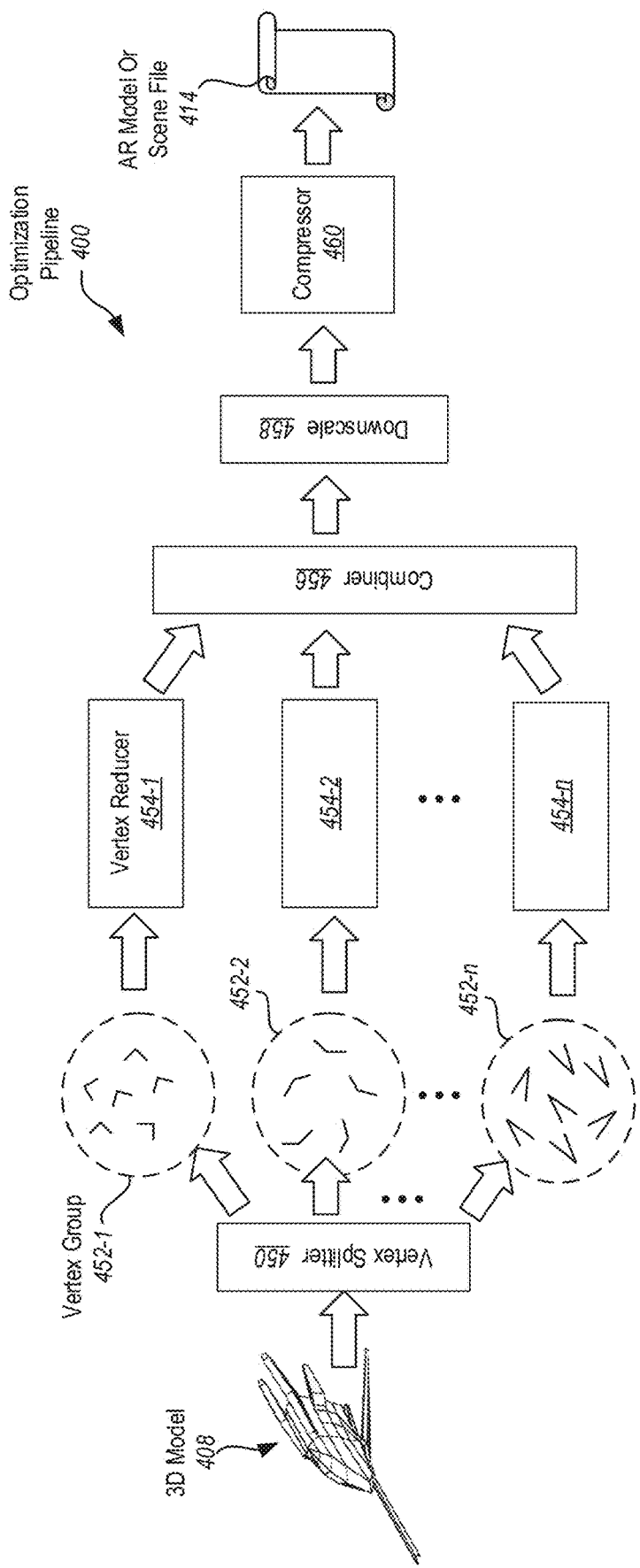
FIG. 4 illustrates a system for compressing 3D models prior to creating AR models or scene files therefrom in accordance with one or more embodiments of the present disclosure.

Referring now to FIG. 4, an optimization pipeline 400 is illustrated. The optimization pipeline 400 may be implemented on the server 102 illustrated in FIG. 1. The various elements of the optimization pipeline 400 may be implemented using various hardware, software, and other computing elements. For example, in some embodiments, the various elements may be implemented using a general-purpose processor executing machine readable instructions. Alternatively, or additionally, embodiments may be implemented where the various elements are implemented in hardware devices having appropriate firmware. Alternatively, or additionally, various elements may be implemented in various programmable logic devices including permanently programmed devices or updatable devices.

Returning once again to FIG. 4, a 3D model 408 is illustrated. Typically, a 3D model includes a number of vertices defining various surfaces on the 3D model. Typically, the 3D model 408 is created using 3D scans, CAD drawings, user-created models, or other high-definition 3D models of objects. As noted, the 3D model 408 is typically high resolution and contains a large amount of data such that delivering the 3D model would be difficult in limited bandwidth environments. Therefore, embodiments illustrated herein can use the optimization pipeline 400 to reduce the size of the 3D model 408 to create an optimized model or scene file 414. In general, the embodiments illustrated herein are shown using two techniques to optimize AI model or scene files. These two techniques are vertex reduction and texture size reduction. In particular, based on the intended physical size and viewing distance of an object represented using a model or scene file, there are certain details that will not be able to be resolved by the human eye and can therefore be removed without deleterious effects to the user. The optimization pipeline 400 can be used to implement these two techniques.

For example, FIG. 4 illustrates a vertex splitter 450. The vertex splitter 450 splits the 3D model 408 into n distinct vertex groups 452-1, 452-2, through 452-n. The different vertex groups each include different types of meshes extracted from the 3D model 408. This is done because different kinds of meshes can be operated on using different tools, each tool being more effective than other tools for a given type of mesh. In particular, FIG. 4 illustrates that the vertex groups 452-1, 452-2, and 452-n, are provided to vertex reducers 454-1, 454-2, and 454-n respectively. Each vertex reducer calculates which vertices are invisible, or less visible, to a viewer and changes the mesh so that those details are replaced by simpler geometry. This is done using a variety of tools, including voxel remeshing, normal map baking, multiple decimation techniques, dissolving vertices, occlusion raycast calculations, etc.

The vertex groups can then be recombined by a combiner into a vertex-reduced 3D model. This vertex reduced 3D model is provided to a downscaler 458. The downscaler 458 calculates the physical pixel size of the various textures and down scales where appropriate. In some embodiments, textures are rebaked to pack them more efficiently. This creates a pixel-reduced 3D model. Furthermore, the downscaler 458 may operate, in some embodiments, to receive 2D texture data associated with the 3D model and downscale the 2D texture data such that the physical size of the AR model or scene file is consistent when the AR model or scene file is viewed in an AR or XR environment.

The optimization pipeline 400 further includes a compressor 460. The pixel-reduced 3D model is converted by the compressor to an AR model or scene file 414 in the fashion described previously. In some embodiments, the compressor applies different algorithms based on the target file type (e.g., .gltf, .sfb, or .usdz and based on the particular AR platform in which the file will be viewed) of the AR model or scene file 414 that is converted.

In some implementations, a source file (e.g., a 3D model file or AR object file) has one or more sounds associated therewith (e.g., support files including sound) that complement the final AR experience. Additionally, some target AR file formats and/or platforms accommodate supporting sound files, while others do not. Accordingly, in some embodiments, an optimization pipeline 400 includes steps for disassociating support files, such as sound files, from the source file (e.g., 3D model 408 or AR object file) before optimizing the source file according to the steps described hereinabove. After one or more optimized AR models or scene files 414 are generated, the optimization pipeline 400 may include re-associating the support files with all AR models or scene files 414 that accommodate support files such as sound files, while refraining from associating support files with AR models or scene files 414 that do not accommodate support files such as sound files.

Additionally, in some instances, while a particular type of target AR model or scene file might generally accommodate sound support files, some AR platforms that support the particular file type might not allow sound support files. Accordingly, optimization pipeline 400 may include creating multiple versions of a particular AR model or scene file 414 that are the same file type, some with sound support files associated therewith, and others without.

Systems and Methods for Estimating a Physical Surface for Rendering XR Content

Rendering XR content can be a processor intensive task that is time consuming. To ameliorate the wait time, in some embodiments, AR content can be rendered at an end user device without initially determining or locating a real-world surface upon which the rendered XR content is to be placed. The AR content can be rendered at a position in the real-world based on measurements previously taken and stored on the device related to the average height of a surface (e.g., the ground). Additionally, or alternatively, the position can be estimated based on the height of the user or the average height of a user or based on the average height of the electronic device with respect to a surface (e.g., the ground) when displaying AR content to a user.

Once the estimated surface is determined, the rendered AR content can be displayed to the user. Before, during, and/or after displaying the AR content, the system can additionally determine and/or locate an actual surface in the real-world upon which to place the AR content. After identifying the real-world surface, the AR content can be moved to the surface, if such movement is required. In some embodiments, the estimation is accurate, making any movement to the identified real-world surface minimal or barely perceptible.

Exemplary Methods of the Present Disclosure

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. It will furthermore be appreciated that the various embodiments of the present disclosure need not include every act described hereinbelow.

Figure 5:
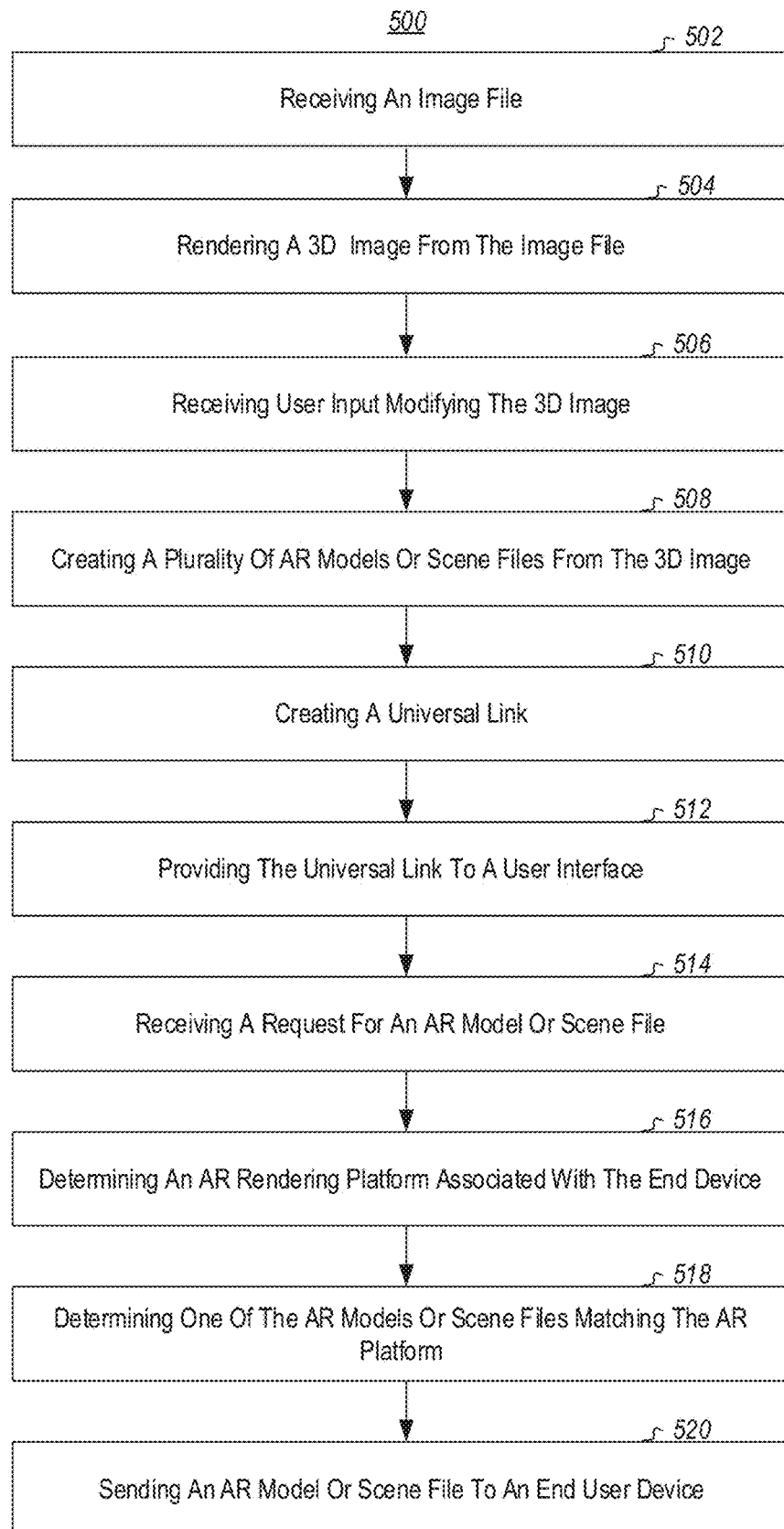
FIG. 5 illustrates a method implemented at a user interface for generating forms of XR content, according to one or more embodiments of the present disclosure.

FIG. 5 shows a flow diagram 500 depicting acts of methods associated with generating and intelligently distributing forms of extended reality content. In particular, the flow diagram 500 includes acts of receiving an image file (502), rendering a 3D image from the image file (504), receiving user input modifying the 3D image (506), creating a plurality of AR models or scene files from the 3D image (508), creating a universal link (510), providing the universal link to a user interface (512), receiving a request for an AR model or scene file (514), determining an AR rendering platform associated with the end user device (516), determining one of the AR models or scene files matching the AR platform (518), and sending an AR model or scene file to an end user device (520).

As noted above, act 502 includes receiving an image file. In some embodiments, the image file is a 3D image file received from a user/developer device (e.g., after a user executes a command on a user interface of the user device). In other embodiments, the image file received is a 2D image file, and a 3D image file is created from the 2D image file. The 3D image file can correspond to any 3D image file format, such as 3DS, A3D, COB, SCN, C4D, DAE, DXF, IGES, IV, FBX, KMZ, LW, LWB, LWM, LWO, LWS, LXO, MA, MB, MAX, OBJ, PLY, SKP, STEP, STL, WRL, WRL97, VRML, X, X3D, or XSI.

The image file can include, for example, an image of one or more products that the user intends to be presented to one or more clients through a client AR interface/platform.

Act 504 includes rendering a 3D image from the image file. As noted above, in some instances the 3D image/model is derived from a received 2D image file. In some embodiments, a system sends the rendered 3D image/model to a user interface. In some instances, the user interface is the same user interface from which the image file was received.

Act 506 includes receiving user input modifying the 3D image. In some embodiments, the user input includes instructions received from a user input device/interface for modifying certain visual characteristics of the 3D image, such size/scale, positioning, rotation, texture, optical properties (e.g., reflectance, transparency), brightness, contrast, color, shading, etc.

In some instances, act 506 also includes receiving user input which indicates a selected platform. In one example, a user input indicates a standard HTML platform, HTML 5 platform, social media platform, AR platform, device platform (e.g., iOS, Android, etc.), and/or browser type. In some embodiments, the selected platform corresponds to a platform upon which one or more AR representations of the image received according to Act 502 will be presented to one or more clients.

In some embodiments, the modifications of act 506 are automated modifications. For example, automated modifications can be performed based on presets/settings defined by a user. In another example, automated modifications are performed based on known attributes/characteristics of the platform upon which a representation of the 3D image will be shown. (e.g., in accordance with characteristics of the selected platform described above).

Act 508 includes creating a plurality of AR models or scene files from the 3D image. In some embodiments, the plurality of AR models or scene files includes a derivative AR model or scene file for each AR rendering platform included in a predetermined list of AR rendering platforms. The AR rendering platforms can be, in some instances, particular AR viewers/applications, versions of AR viewers, browser types, versions of browser types, operating systems, and/or versions of operating systems. The list of AR rendering platforms can include any hardware/software information and/or constraints pertaining to the AR rendering platforms. Accordingly, each of the AR models or scene files of the plurality are formatted for different combinations of AR rendering platforms, file formats, and/or rendering properties associated with known end user devices.

Furthermore, in some embodiments the list of AR rendering platforms is updatable, such that when the presence of one or more additional AR rendering platforms is determined within the list, additional corresponding AR models or scene files are created from the 3D image for the new AR rendering platform.

In some embodiments, the file size of the 3D image is compressed (or optimized/decimated) before or as part of creating the AR models or scene files from the 3D image. Thus, in some embodiments, the plurality of AR models or scene files are created based on the compressed (or optimized/decimated) 3D image.

The optimization/decimation of the 3D image file comprises, in some instances, splitting the 3D image into a plurality of distinct vertex groups. Each vertex group can include a different type of mesh extracted from the 3D image, and different optimization/decimation techniques can be applied to the different vertex groups. Subsequently, at least a subset of the vertices of the plurality of distinct vertex groups is provided to a vertex reducer for removing and/or replacing one or more vertices of the subset with simpler geometry. For example, some vertices of the plurality of distinct vertex groups will be invisible or less visible to a viewer (e.g., they are occluded by part of the object/product represented in the 3D image), so these vertices can be removed and/or replaced. In some embodiments, determining which vertices to remove and/or replace includes voxel remeshing, normal map baking, multiple decimation techniques, dissolving vertices, occlusion raycast calculations, etc. Then, the plurality of distinct vertex groups is recombined into a vertex-reduced 3D image which, in some embodiments, is provided to a downscaler which is configured to downscale a physical pixel size of one or more textures associated with the 3D image. In some instances, one or more textures of the 3D image are rebaked for efficiency. By some or all of the foregoing steps, an optimized, pixel-reduced 3D image is created, which can be converted into an appropriate AR model or scene file format (e.g., after conventional compression algorithms are applied thereto).

Act 510 includes creating a universal link. In some embodiments, the universal link point points to an endpoint at a server (e.g., a server that performs at least some of the acts described in flowchart 500). The endpoint can include logic for determining which of the plurality of AR models or scene files (e.g., the AR models or scene files created according to act 508) to provide to an entity accessing the universal link (e.g., a user or client AR interface/platform, such as a head-mounted display (HMD) implemented as a pair of AR glasses).

Act 512 includes providing the universal link to a user interface. The universal link is operable, at an end user device, to enable an end user (e.g., client) of the end user device to navigate to the endpoint on the server (e.g., the server discussed above with reference to act 510). In some instances, providing the universal link to the user interface includes displaying the universal link in a format that allows the universal link to be copied into an application for a selected device platform, including displaying additional code for the device platform. For example, the universal link can be provided to a user interface, from which it can be copied and distributed or embedded into other platforms for selection by end users and clients.

Act 514 includes receiving a request for an AR model or scene file. The request can be a result of the universal link being selected at an end user device. In some instances, the request received (e.g., by the server) is generated by an end user device (e.g., client device) to which the universal link was distributed/provided (e.g., according to act 512 described above).

Act 516 includes determining an AR rendering platform associated with the end user device. In some embodiments, a user agent string or other identifier of the request received according to act 514 is used to identify the AR platform and/or capabilities/characteristics of the AR platform (e.g., type/version of user system, internet browser, operating system, AR viewer/application, device platform, social media platform, etc.).

Act 518 includes determining one of the AR models or scene files matching the AR platform. In some embodiments, this determination is made according to the logic of the endpoint at the server (e.g., described in act 510) and based on the AR rendering platform determined in act 516. For example, upon determining the AR rendering platform and/or characteristics associated with the end user device, a server identifies an AR model or scene file suited for display on the AR rendering platform based on the updatable list of AR rendering platforms that was initially used to create the plurality of AR models or scene files from the 3D image (e.g., as described with reference to act 508).

Finally, act 520 includes sending an AR model or scene file to an end user device. The AR model or scene file is operable for being rendered as part of an AR experience at the end user device. For example, after a server sends the appropriate AR model or scene file to a client or end user device, the client or end user device renders the AR model or scene file that was sent in an AR experience at the end user device (e.g., see FIG. 3). In some embodiments, the AR model or scene file is caused to be rendered (or prerendered) at the end user device before an environmental surface is determined by the end user device on which the AR model is to be rendered (e.g., to which the AR model is to be anchored in the environment), such as by rendering the AR model based on an estimation of an environmental surface on which the AR model is to be rendered. For example, the AR model can be caused to be rendered based on measurements previously taken and stored on the end user device related to the specific or average height of a surface, user, device, etc. After rendering the AR model based on the estimation, the AR model can be subsequently rendered (e.g., transitioned or shifted) to a more rigorously calculated position in the user's environment (e.g., with respect to a surface in the user's environment).

Computer Systems of the Present Disclosure

It will be appreciated that computer systems are increasingly taking a wide variety of forms. In this description and in the claims, the term "computer system" or "computing system" is defined broadly as including any device or system—or combination thereof—that includes at least one physical and tangible processor and a physical and tangible memory capable of having thereon computer-executable instructions that may be executed by a processor. It will be appreciated that multiple processors that perform different or identical processing functions may be implemented in a single computing system, such as various combinations of a central processing units (CPUs), graphics processing units (GPUs), and/or holographic processing units (HPUs). By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multiprocessor systems, network PCs, distributed computing systems, datacenters, message processors, routers, switches, XR HMDs, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Although the subject matter described herein is provided in language specific to structural features and/or methodological acts, it is to be understood that the subject matter defined in the appended claims is not necessarily limited to the described features or acts so described. Rather, the described features and acts are disclosed as example forms of implementing the claims.

CONCLUSION

Unless defined otherwise, all technical and scientific terms used herein have the same meaning as commonly understood by one of ordinary skill in the art to which the present disclosure pertains.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A method of providing virtual reality (VR) content, the method comprising:
at a server,
obtaining a 3D image file;
creating a plurality of VR models or scene files from the 3D image for each VR rendering platform included in a list of VR rendering platforms, wherein each of the VR models or scene files are formatted for rendering a representation of the 3D image on a different, particular VR rendering platform included in the list of VR rendering platforms;
storing each of the plurality of VR models or scene files for each VR rendering platform included in the list of VR rendering platforms within a data store, the data store being accessible by the server to initiate sending a particular stored VR model or scene file that corresponds to a particular VR rendering platform included in the list of VR rendering platforms to a requesting end user device that uses the particular VR rendering platform included in the list of VR rendering platforms in response to a universal link associated with the plurality of VR models or scene files being selected at the requesting end user device and in response to determining that the end user device uses the particular VR rendering platform included in the list of VR rendering platforms;
receiving a request for a VR model or scene file, as a result of a universal link being selected at an end user device, wherein the universal link points to an endpoint at the server that comprises logic to determine which of the plurality of stored VR models or scene files to provide to an entity accessing the universal link;
determining a VR rendering platform associated with the end user device; and
determining, by the logic and based on the VR rendering platform associated with the end user device, one of the VR models or scene files of the plurality of stored VR models or scene files matching the VR rendering platform.

2. The method of claim 1, wherein the VR rendering platform associated with the end user device is determined to be a new VR rendering platform.

3. The method of claim 2, further comprising updating the list of VR rendering platforms to include the new VR rendering platform; and creating additional corresponding VR models or scene files formatted for rendering a corresponding representation of the 3D image on the new VR rendering platform.

4. The method of claim 3, further comprising storing each additional corresponding VR model or scene file within the data store.

5. The method of claim 1, further comprising receiving user input at the end user device selecting a device platform.

6. The method of claim 5, wherein the selected device platform is determined to be a new VR rendering platform.

7. The method of claim 6, further comprising updating the list of VR rendering platforms to include the new VR rendering platform; and creating additional corresponding VR models or scene files formatted for rendering a corresponding representation of the 3D image on the new VR rendering platform.

8. The method of claim 7, further comprising storing each additional corresponding VR model or scene file within the data store.

9. The method of claim 1, further comprising determining a presence of one or more additional virtual reality rendering platforms within the list, and as a result, creating additional corresponding VR models or scene files and storing each additional corresponding VR model or scene file within the data store.

10. A method of providing virtual reality (VR) content, the method comprising:
creating a plurality of VR models or scene files from a base image, wherein the plurality of VR models or scene files comprises a respective VR model or scene file formatted for rendering a VR representation of the base image on a corresponding VR rendering platform included in a list of VR rendering platforms, and wherein every VR rendering platform in the list of VR rendering platforms corresponds to at least one respective VR model or scene file of the plurality of VR models or scene files;
storing the plurality of VR models or scene files within a data store accessible by a server associated with a universal link pointing to an endpoint at the server, the endpoint comprising logic to determine which of the plurality of stored VR models or scene files to provide to an entity accessing the universal link;
receiving a request for a VR model or scene file as a result of the universal link being accessed by the entity, wherein the request includes an identity of an operating VR rendering platform;
determining, based on the logic associated with the endpoint and based on the identity of the operating VR rendering platform, a compatible VR model or scene file of the plurality of stored VR models or scene files operable on the operating VR rendering platform; and
sending the compatible VR model or scene file to the entity.

11. The method of claim 10, wherein the identity of the operating VR platform is comprised within the list of VR rendering platforms.

12. The method of claim 10, wherein creating the plurality of VR models or scene files from the base image comprises formatting a VR model or scene file for each of a different file format and for each of a different combination of rendering properties associated with known end user devices.

13. The method of claim 12, wherein the identity of the operating VR rendering platform is determined to be a new VR rendering platform.

14. The method of claim 13, further comprising updating the list of VR rendering platforms to include the new VR rendering platform; and creating additional corresponding VR models or scene files formatted for rendering a corresponding representation of the base image on the new VR rendering platform.

15. The method of claim 14, further comprising storing each additional corresponding VR model or scene file within the data store.

16. A system for providing virtual reality (VR) content, comprising:
a computer system in electronic communication with an end user device and with a remote server having a plurality of VR models or scene files stored thereon, the computer system comprising:
one or more processors; and
one or more hardware storage devices having stored thereon computer-executable instructions that, when executed by the one or more processors, cause the computer system to perform at least the following:
receiving a request from the end user device for selected VR content, the request including end user device information for determining an identity of an VR rendering platform associated with the end user device;
accessing a universal link pointing to an endpoint at the remote server to thereby transmit the request for the selected VR content to the remote server;
receiving a compatible VR model or scene file from the remote server, wherein the compatible VR model or scene file is selected from the plurality of VR models or scene files stored on the remote server based at least in part on the end user device information included within the request, and wherein the compatible VR model or scene file is formatted for rendering the selected VR content at the end user device; and
sending the compatible VR model or scene file to the end user device for rendering the VR content at the end user device.

17. The system of claim 16, wherein each of the plurality of VR models or scene files stored on the remote server are formatted to render VR content for rendering on at least one particular VR rendering platform included in a list of VR rendering platforms.

18. The system of claim 17, wherein the list of VR rendering platforms is stored on the remote server.

19. The system of claim 17, wherein the computer-executable instructions further cause the computer system to determine the identity of the VR rendering platform by matching a combination of rendering properties associated with the end user device information with a known set of rendering properties associated with at least one VR rendering platform included in the list of VR rendering platforms.

20. The system of claim 16, wherein the computer-executable instructions cause the computer system to access the universal link in response to receiving the request from the end user device.

* * * * *